United States Patent
Vaughan

(10) Patent No.: US 9,282,113 B2
(45) Date of Patent: Mar. 8, 2016

(54) DENIAL OF SERVICE (DOS) ATTACK DETECTION SYSTEMS AND METHODS

(71) Applicant: Cellco Partnership, Basking Ridge, NJ (US)

(72) Inventor: John F. Vaughan, Branchburg, NJ (US)

(73) Assignee: Cellco Partnership, Basking Ridge, NJ (US)

( * ) Notice: Subject to any disclaimer, the term of this patent is extended or adjusted under 35 U.S.C. 154(b) by 181 days.

(21) Appl. No.: 13/929,020

(22) Filed: Jun. 27, 2013

(65) Prior Publication Data

US 2015/0007314 A1 Jan. 1, 2015

(51) Int. Cl.
*H04L 29/06* (2006.01)

(52) U.S. Cl.
CPC ........ *H04L 63/1425* (2013.01); *H04L 63/1408* (2013.01); *H04L 63/1416* (2013.01); *H04L 63/1441* (2013.01); *H04L 63/1458* (2013.01); *H04L 2463/141* (2013.01)

(58) Field of Classification Search
CPC ............ H04L 63/1458; H04L 63/1408; H04L 63/1441; H04L 63/1416; H04L 2463/141
See application file for complete search history.

(56) References Cited

U.S. PATENT DOCUMENTS

| | | | |
|---|---|---|---|
| 7,752,324 B2 | 7/2010 | Hamadeh et al. | |
| 8,499,348 B1 * | 7/2013 | Rubin | G06F 21/554 713/154 |
| 2003/0145232 A1 * | 7/2003 | Poletto | H04L 63/1408 726/22 |
| 2004/0054925 A1 * | 3/2004 | Etheridge | H04L 63/1458 726/22 |
| 2004/0187034 A1 * | 9/2004 | Tamura | H04L 63/1458 726/27 |
| 2004/0250124 A1 * | 12/2004 | Chesla | G06F 21/552 726/13 |
| 2005/0111367 A1 * | 5/2005 | Jonathan Chao | H04L 63/1458 370/235 |
| 2006/0010389 A1 * | 1/2006 | Rooney | H04L 63/1425 715/736 |
| 2006/0107318 A1 * | 5/2006 | Jeffries | H04L 63/1416 726/22 |
| 2006/0173992 A1 * | 8/2006 | Weber | H04L 63/1425 709/224 |
| 2006/0212932 A1 * | 9/2006 | Patrick | H04L 63/1441 726/11 |
| 2007/0016663 A1 * | 1/2007 | Weis | G06F 11/2028 709/223 |

(Continued)

OTHER PUBLICATIONS

Protection Against DDoS Attacks Based on Traffic Level Measurements; Boldizsar Bencsath et al.; 2004.*

(Continued)

*Primary Examiner* — James Turchen

(57) ABSTRACT

Methods, systems, and apparatus that enable identification of network attacks such as denial of service attacks are disclosed. A network attack may be identified by monitoring packets received for delivery to devices on a network, and developing a historic packet profile by examining the monitored packets received during a number of time periods preceding an instant time period. An instant packet profile is developed by examining the monitored packets during the instant time period. The instant packet profile is compared to the historic packet profile to determine whether a deviation exceeding a predetermined statistical threshold deviation between the instant packet profile and the historic packet profile is present. The existence of a network attack is identified in response to determining that the deviation exceeds the predetermined statistical threshold deviation.

20 Claims, 10 Drawing Sheets

(56) References Cited

U.S. PATENT DOCUMENTS

| | | | | |
|---|---|---|---|---|
| 2007/0083927 | A1* | 4/2007 | Swaroop | H04L 63/1408 726/22 |
| 2007/0157306 | A1* | 7/2007 | Elrod | H04L 63/1416 726/14 |
| 2007/0280114 | A1* | 12/2007 | Chao | H04L 43/0888 370/235.1 |
| 2008/0005360 | A1* | 1/2008 | Belgaied | H04L 63/1408 709/251 |
| 2008/0028467 | A1* | 1/2008 | Kommareddy | H04L 63/1458 726/23 |
| 2009/0007266 | A1* | 1/2009 | Wu | H04L 63/1458 726/22 |
| 2009/0077413 | A1* | 3/2009 | Dake | H04L 63/1458 714/4.1 |
| 2009/0293123 | A1* | 11/2009 | Jackson | H04L 63/1458 726/23 |
| 2010/0026494 | A1* | 2/2010 | Lees | H04L 9/0819 340/572.1 |
| 2012/0216282 | A1* | 8/2012 | Pappu | H04L 63/1416 726/23 |
| 2013/0104230 | A1* | 4/2013 | Tang | G06F 21/552 726/23 |
| 2014/0181966 | A1* | 6/2014 | Carney | H04L 63/1458 726/22 |
| 2014/0373146 | A1* | 12/2014 | Murthy | H04L 63/1408 726/23 |
| 2014/0380467 | A1* | 12/2014 | Winquist | H04L 63/1408 726/22 |

OTHER PUBLICATIONS

A Mechanism for Detection and Prevention of Distributed Denial of Service Attacks; Jaydip Sen; LNCS 4308, pp. 139-144; 2006.*
Detecting Distributed Denial of Service Attacks: Methods, Tools and Future Directions; Monowar H. Bhuyan et al.; 2013.*
NetShield: Protocol Anomaly Detection with Datamining Against DDoS Attacks; Kai Hwang; Mar. 31, 2013.*

* cited by examiner

DENIAL OF SERVICE (DOS) ATTACK DETECTION SYSTEMS AND METHODS

BACKGROUND INFORMATION

Packet-based communications have gained wide acceptance in modern society. A wide range of services, which utilize packet-based communication transport, are now commonly available on home computers, mobile devices such as smartphones and tablets as well as televisions. Even voice communications are transitioning to use of packet-switched data communications type transport as a replacement for older technologies. Most if not all modern enterprises are dependent on communication through packet-based networks, to at least some extent. In many cases, such communications are mission critical. With such wide adoption of packet network communications, levels of service availability and high degrees of reliability become mandatory. Any compromise of service causes not only severe inconvenience but may incur severe financial loss.

It is not uncommon for malicious devices in a communication network to attempt to compromise the network by bombarding a device and/or network with network traffic, thereby preventing legitimate devices from enjoying the services of the network. Such attacks are called "denial-of-service" (DoS) attacks. When multiple devices, e.g., a botnet, launch a DoS attack, it is known as a Distributed DoS (DDos) attack.

Communication networks may use network protection devices, such as firewalls, to block unwanted and/or potentially malicious traffic from infiltrating the network.

BRIEF DESCRIPTION OF THE DRAWINGS

Examples are best understood from the following detailed description when read in connection with the accompanying drawings, with like elements having the same reference numerals. When a plurality of similar elements are present, a single reference numeral may be assigned to the plurality of similar elements with a dash followed by a numeral designation referring to specific elements. When referring to the elements collectively or to a non-specific one or more of the elements, the small letter designation may be dropped. Included in the drawings are the following figures.

DETAILED DESCRIPTION

In the following detailed description, numerous specific details are set forth by way of examples in order to provide a thorough understanding of the relevant teachings. However, it should be apparent that the present teachings may be practiced without such details. In other instances, well known methods, procedures, and/or components have been described at a relatively high-level, without detail, in order to avoid unnecessarily obscuring aspects of the present teachings. Also, the following detailed description does not limit the invention, as claimed.

Figure 1A:
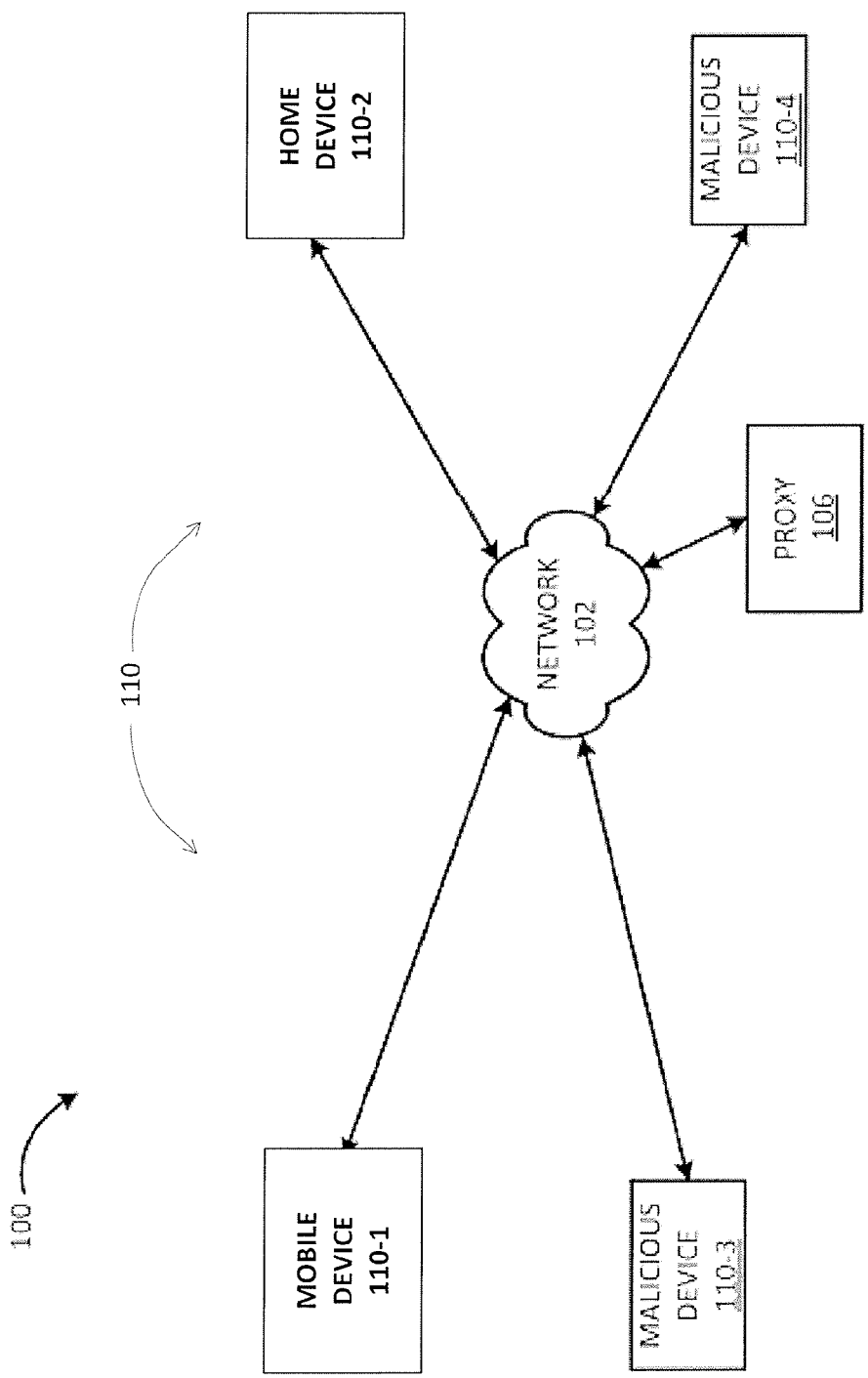
FIG. 1A is a block diagram of components of a network in which network attacks are identified in accordance with teachings described herein.

FIG. 1A is a block diagram of exemplary components of a communication system 100 for implementing embodiments disclosed herein. The communication system 100 includes numerous devices 110 (individually, "device 110-x") coupled to a network 102. Devices 110 may include, for example, a mobile device 110-1 and a home device 110-2. Devices 110 may also include malicious devices 110-3 and 110-4. Overwhelming a particular device may deny service to that device and/or service to other devices attempting to communicate with the particular device that is under attack.

Examples disclosed herein monitor packets on a packet-switched network to detect changes in the types of packets over time that form the packet traffic on the network. As used herein, the term packet refers to a unit of data that is routed between a source and a destination over a packet-switched network. A change in the types of packets can provide an indication of the existence of a denial-of-service (DoS) attack designed to overwhelm a device. Detection of a significant change in the type of packets may be more sensitive in identifying the existence of such attacks than looking solely at the volume of packets on the network. Once the existence of a DoS attack is identified, the packet traffic can be examined further to identify the malicious entity(ies) associated with the DoS attack. Different types of packet protocols are used to send packets over packet-switched networks. Examples of packet protocols include, among many others, User Datagram Protocol (UDP), Transmission Control Protocol (TCP), Internet Control Message Protocol (ICMP), and Internet Group Management Protocol (IGMP). As used herein, the term packet type means the protocol of the packet. As also used herein, the term "packet profile" means one or more features of packets captured during a period of time that can be used to characterize those packets. Examples of packet profiles include a ratio of number or rate of packets of at least one packet type (e.g., number or rate of TCP packets) to number/rate of packets of one or more other packet types (e.g., UDP packets, UDP/TCP packets, all packets, etc.). Additionally, or alternatively, the packet profile may include other features such as average number of packets in multiple sample time periods and a sample standard deviation representing the deviation of the packet ratio among the multiple sample time periods.

The communication system 100 may also employ a proxy 106 to handle session signaling on behalf of multiple devices. The proxy may handle session signaling for many (e.g., thousands or millions) of devices. Therefore, overwhelming a proxy may deny service to thousands or millions of customers. Embodiments disclosed herein may also detect a change in packet profiles on the network (e.g., a change in statistics with regards to the packets flowing through a network protection device such as a firewall) to identify DoS attacks designed to overwhelm a proxy 106.

Exemplary techniques and equipment described herein may be used to help thwart DoS attacks originating from a single device and distributed DoS (DDoS) attacks originating from multiple devices by detecting and halting such attacks. The example described herein may be used to identify such attacks on devices themselves (e.g., home device 110-2) and/or proxies for these devices. The examples described herein may also be used to detect the end of such attacks.

In communication system 100, the user of mobile device 110-1 may wish to call home device 110-2, for example, through network 102. The call, or session, may be established using optional proxy 106 and a session control protocol. Malicious devices 110-3 and/or 110-4 such as processing devices under the control of malevolent individuals, however, may try to disrupt communication system 100 (e.g., by attacking the individual devices 110-1 or the optional proxy 106) using a DoS or DDoS attack that would prevent packet transmissions, e.g., from mobile device 110-1 to home device 110-2.

Network 102 may include a wired or wireless network. Network 102 may include a wireless public land mobile network (PLMN) (e.g., a cellular network). The PLMN may include a Code Division Multiple Access (CDMA) 2000 PLMN, a Global System for Mobile Communications (GSM) PLMN, a Long Term Evolution (LTE) PLMN and/or other type of PLMN. In addition to a wireless network, network 102 may include one or more other networks of various types, such as, for example, a telecommunications network (e.g., a Public Switched Telephone Network (PSTN)), a local area network (LAN), a wide area network (WAN), a metropolitan area network (MAN), an intranet, the Internet, and/or a cable network (e.g., an optical cable network). Network 102 may include a wireless satellite network.

Devices 110-x may include mobile telephones, home telephones, personal digital assistants (PDAs), laptop computers, desktop computers, tablet computers, or another type of computation or communication device that is configured for packet communication over a network. Devices 110-x may connect to network 102 via wired, wireless, and/or optical connections. Devices 110-x may include user agents (UAs) that implement SIP according to the Internet Engineering Task Force (IETF) document RFC 2543 and document RFC 3261.

Proxy 106 may include a device that facilitates the establishment, definition, and termination of sessions, such as telephone calls, on behalf of devices (e.g., devices 110-x). Proxy 106 may implement SIP according to the IETF document RFC 2543 and document RFC 3261. Proxy 106 may route requests to a user's location, authenticate and authorize users for services provided by proxy 106, implement call-routing policies, and provide other features to users.

DoS attacks against components (e.g., proxy 106 or devices 110-1 and 110-2) may include attacks that flood a device with messages. Message flooding attacks occur when a large number of packets are sent to the component (e.g., proxy 106 or individual devices 110-1 and 110-2) in order to overwhelm the processing capacity of that component. In this case, the component under attack is too busy to process all the non-attack, legitimate packets. Flooding attacks can occur from few sources (e.g., one or a limited number of sources) in the case of a DoS attack, or multiple sources (e.g., an unmanageably large number of distributed sources) in the case of a DDoS attack. In case of multiple sources, each attack from each source may individually go undetected, but the combined attack from the sources may overwhelm the component. A flooding attack may include media flooding, e.g., sending a large number of files to a device.

In a typical DoS attack, the source of the attack is usually a single server or a small network of servers. Such attacks may be successfully handled by IP address blocking (e.g., of a finite number of source addresses and/or destination addresses). In a DDoS attack, a network of perhaps millions of unwitting computers (e.g., a "botnet") is commandeered to carry out the DDoS attack. Such attacks may be successfully handled by temporary IP address blocking (e.g., of a finite number of destinations).

Figure 1B:
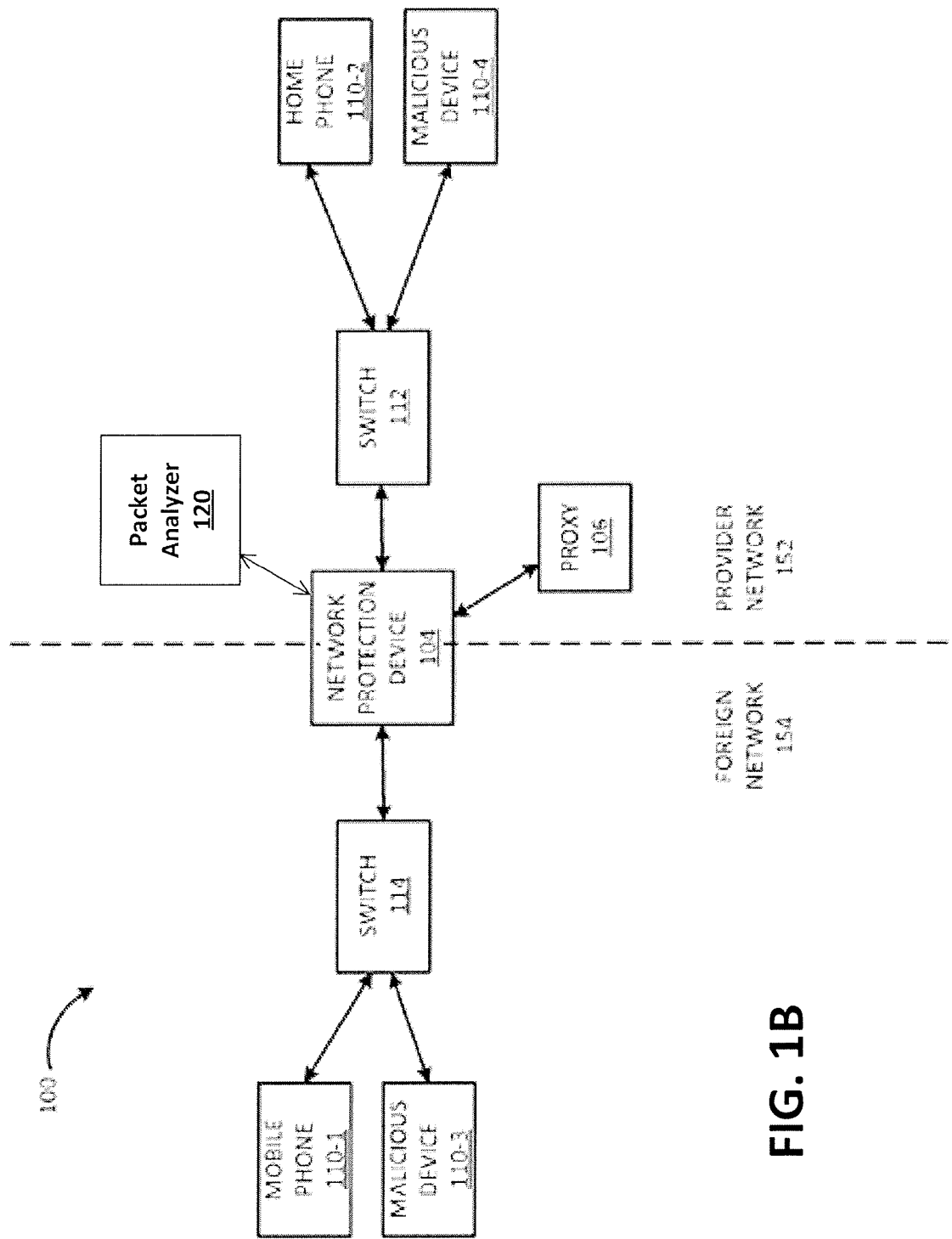
FIG. 1B is a block diagram of the network of FIG. 1A with additional detail in accordance with teachings described herein.

FIG. 1B is a block diagram of communication system 100 showing additional components for use with various embodiments. In addition to those components shown in FIG. 1A, FIG. 1B depicts a network protection device 104 (NPD 104) and switches 112 and 114. FIG. 1B also shows a packet analyzer 120, which is discussed in detail below, and shows the communication system 100 divided into a provider network 152 and a foreign network 154.

In the example shown, provider network 152 may provide devices 110 with communication services (e.g., directly or through proxy 106). That is, the users of devices 110 in provider network 152 may subscribe to these services. Provider network 152 may deploy NPD 104 to protect provider network 152 from malicious devices in foreign network 154 (e.g., malicious device 110-3). In some examples, the NPD 104 may also protect provider network 152 from malicious devices in provider network 152 (e.g., malicious device 110-4). In this embodiment, NPD 104 may protect device 110-2 and/or proxy 106 against malicious network traffic, such as a DoS or DDoS attack.

NPD 104 may be located to receive traffic from foreign network 154 (e.g., rather than device 110-2 and/or proxy 106 receiving the traffic directly). The NPD 104 may be configured to block traffic through the use of filters, which may be set/removed under the direction of packet analyzer 120. NPD 104 may be a conventional firewall such as a Juniper SRX firewall available from Juniper Networks, Inc. of Sunnyvale, Calif.

Packet analyzer 120 is configured to gather and analyze packets flowing through the NPD 104. Packet analyzer 120 may analyze all packets or a sampling of packets. Packet analyzer may be coupled to the NPD 104 directly to receive packets and/or packet information; or the NPD 104 may receive packets and/or packet information from network taps on one or both sides of the NPD 104. Packet analyzer 120 may analyze and exert control over signaling messages intended for the proxy 106 through the NPD 104 (e.g., by setting/removing filters). Packet analyzer 120 may also analyze and exert control over media streams intended for the media infrastructure (e.g., switch 112) in provider network 152 though the NPD 104. As shown in FIG. 1B, traffic directed towards the proxy 106, from either foreign network 154 or provider network 152, may first go through the NPD 104 before reaching the proxy 106. Packet analyzer 120 may analyze traffic by inspecting the packets in the internet protocol (IP) layer.

Based on the analysis, the packet analyzer 120 may determine whether to allow or reject packets (e.g., by setting/removing filters in the NPD 104).

As described above, a DoS attack in network 100 may be directed at proxy 106. For example, malicious devices 110-3 and 110-4 may attempt to prevent other devices 110 from placing or receiving calls. The NPD 104 may decrease the processing load on proxy 106 (by blocking DoS traffic identified by packet analyzer 120) so that the proxy 106 may more adequately respond to legitimate traffic.

Figure 1C:
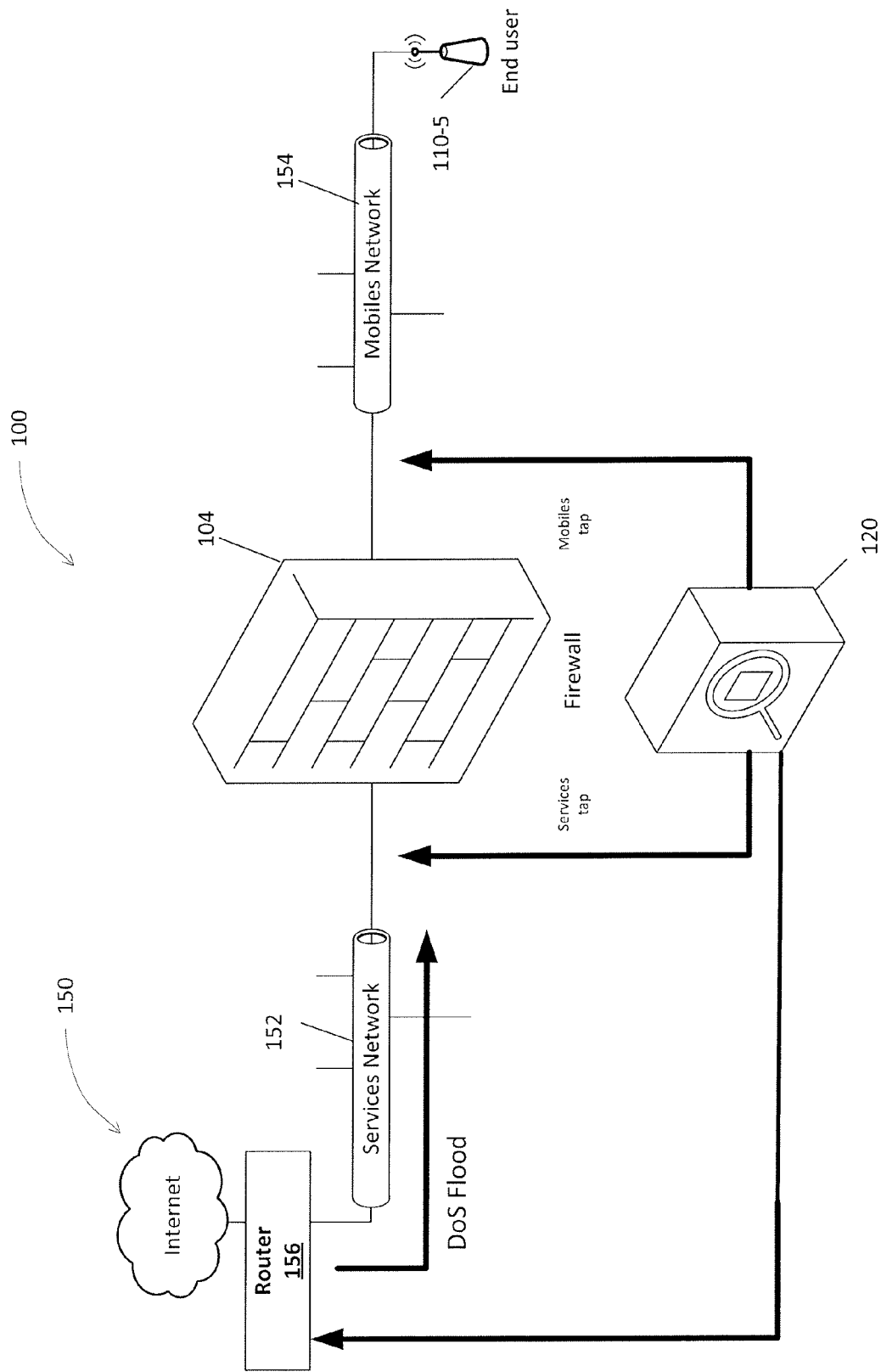
FIG. 1C is an illustration of a mobile network implementation in accordance with teachings described herein.

FIG. 1C illustrates a DoS attack on a communication network 100 in a mobile network example. In this example, a large quantity of malicious traffic (DoS Flood) originating from the Internet 150 is directed to a mobile device end user 110-5 through the foreign network 154 (also referred to here as the mobiles network). Such an attack may be directed to one end user device or to any number of end user devices served via the mobiles network 154. The malicious traffic may be packet message traffic (e.g. text, multimedia message, emails), or other types of packet traffic addressed to one or more end user mobile devices. The malicious traffic passes from the provider network 152 (also referred to here as the services network 152) to a mobiles network 154 in order to reach the mobile device end user 110-5. A firewall 104 is positioned between the services network 152 and the mobiles network 154 to block unauthorized traffic from flowing therebetween. A packet analyzer 120 includes a services tap on the services network side of the firewall 104 and a mobiles tap on the mobiles network side of the firewall 104. The packet analyzer 120 analyzes packets passing through the firewall 104 to identify and halt malicious traffic as described below. The packet analyzer 120 may also identify the end of a network attack as also described below. FIG. 1C further depicts an optional router 156 positioned between the Internet 150 and the services network 152. The router 156 may be controlled by the packet analyzer 120. As described in further detail below, the router 156 may be used to mitigate DoS attacks by blocking malicious traffic.

FIGS. 1A, 1B, and 1C show exemplary components of communication system 100. In other implementations, communication system 100 may include fewer, additional, or a different arrangement of components. For example, communication system 100 may include additional proxies for receiving and forwarding messages. Communication system 100 may also include thousands or millions of devices 110-x. Further, in other implementations, any components of communication system 100 may perform the tasks performed by one or more other component of communication system 100. For example, although the network protection device 104 and packet analyzer 120 are described as separate devices, the functionality of these two devices may be combined into a single device. Alternatively, the functionality of the network protection device 104 or the functionality of the packet analyzer 120 may be distributed between two or more devices.

Figure 2:
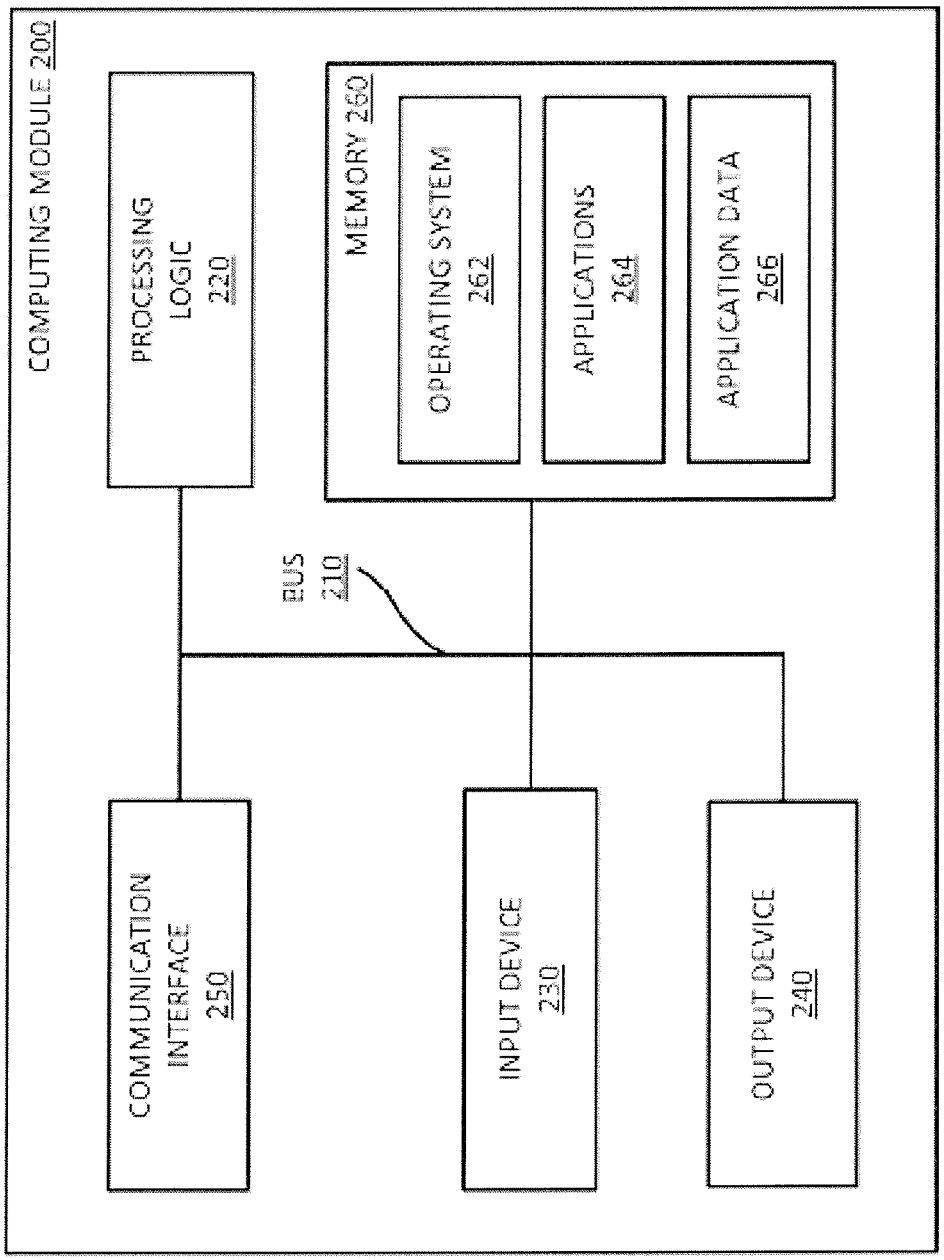
FIG. 2 is a block diagram of a device for use within the networks of FIGS. 1A, 1B, and 1C.

Devices in communication system 100 may each include one or more computing modules. FIG. 2 is a block diagram of exemplary components of a computing module 200. Computing module 200 may include a bus 210, processing logic 220, an input device 230, an output device 240, a communication interface 250, and a memory 260. Computing module 200 may include other components (not shown) that aid in receiving, transmitting, and/or processing data. Moreover, other configurations of components in computing module 200 are possible.

Bus 210 may include a path that permits communication among the components of computing module 200. Processing logic 220 may include any type of processor or microprocessor (or families of processors or microprocessors) that interprets and executes instructions. In other examples, processing logic 220 may include an application-specific integrated circuit (ASIC), a field-programmable gate array (FPGA), a multi-core processor, a reduced-instruction set code (RISC) processor, etc.

Input device 230 may allow a user to input information into computing module 200. Input device 230 may include a keyboard, a mouse, a pen, a microphone, a remote control (e.g., remote control 260), an audio capture device, an image and/or video capture device, a touch-screen display, etc. Some devices, such as home device 110-2 may include a keypad for entering telephone numbers when calling a party. Mobile device 110-1 may include a keypad or a touch screen for entering numbers for calling a party. On the other hand, network protection device 104 and/or proxy 106 may be managed remotely and may not include input device 230. In other words, some devices may be "headless" and may not include a keyboard, for example. In such a headless device, users may interface with the device if and when appropriate utilizing a network communication between the device and some other device having user input/output capabilities.

Output device 240 may output information to the user. Output device 240 may include a display, a printer, a speaker, etc. For example, mobile device 110-1 may include a liquid-crystal display (LCD) for displaying information to the user, such as the name and/or number of a calling party, as well as a speaker or headphone jack for audible output. Headless devices, such as proxy 106, NPD 104 and/or switches 114 and 112 may be managed remotely and may not include output device 240.

Input device 230 and output device 240 may allow a user to activate and interact with a particular service or application, such as telephone application to call a party. Input device 230 and output device 240 may allow a user to receive and view a menu of options and select from the menu options. The menu may allow the user to select various functions or services associated with applications executed by computing module 200. Input device 230 and output device 240 may allow the user to send and receive audio, e.g. for voice calls and other audio function; and/or the input device 230 and output device 240 may allow the user to send or receive video, e.g. for video calls, for uploading or downloading images or videos, etc.

Communication interface 250 may include a transceiver that enables computing module 200 to communicate with other devices or systems. Communication interface 250 may include a transmitter that converts baseband signals to radio frequency (RF) signals or a receiver that converts RF signals to baseband signals. Communication interface 250 may be coupled to an antenna for transmitting and receiving RF signals. Communication interface 250 may include a network interface card, e.g., Ethernet card, for wired communications or a wireless network interface (e.g., a WiFi) card for wireless communications. Communication interface 250 may also include, for example, a universal serial bus (USB) port for communications over a cable, a Bluetooth® wireless interface, a radio-frequency identification (RFID) interface, a near-field communications (NFC) wireless interface, etc.

Memory 260 may store, among other things, information and instructions (e.g., applications 264 and operating system 262) and data (e.g., application data 266) for use by processing logic 220, .e.g., to implement any of the various teachings described herein. Memory 260 may include a random access memory (RAM) or another type of dynamic storage device, a read-only memory (ROM) device or another type of static storage device, and/or some other type of magnetic or optical recording medium and its corresponding drive (e.g., a hard disk drive).

Operating system 262 may include software instructions for managing hardware and software resources of computing module 200. For computers, examples of operating system 262 include Linux, Windows, OS X, OpenSolaris, Unix, etc. In the case of mobile device 110-1, examples of the operating system 262 include MeeGo, Android, WebOS, iOS, Symbian, etc. Applications 264 and application data 266 may provide network services, depending on the device in which the particular computing module 200 is found.

Computing module 200 may perform the operations described herein in response to processing logic 220 executing software instructions contained in a computer-readable medium, such as memory 260. A computer-readable medium may include a physical or logical memory device. The software instructions may be read into memory 260 from another computer-readable medium or from another device via communication interface 250. The software instructions contained in memory 260 may cause processing logic 220 to perform processes that are described herein.

Figure 3:
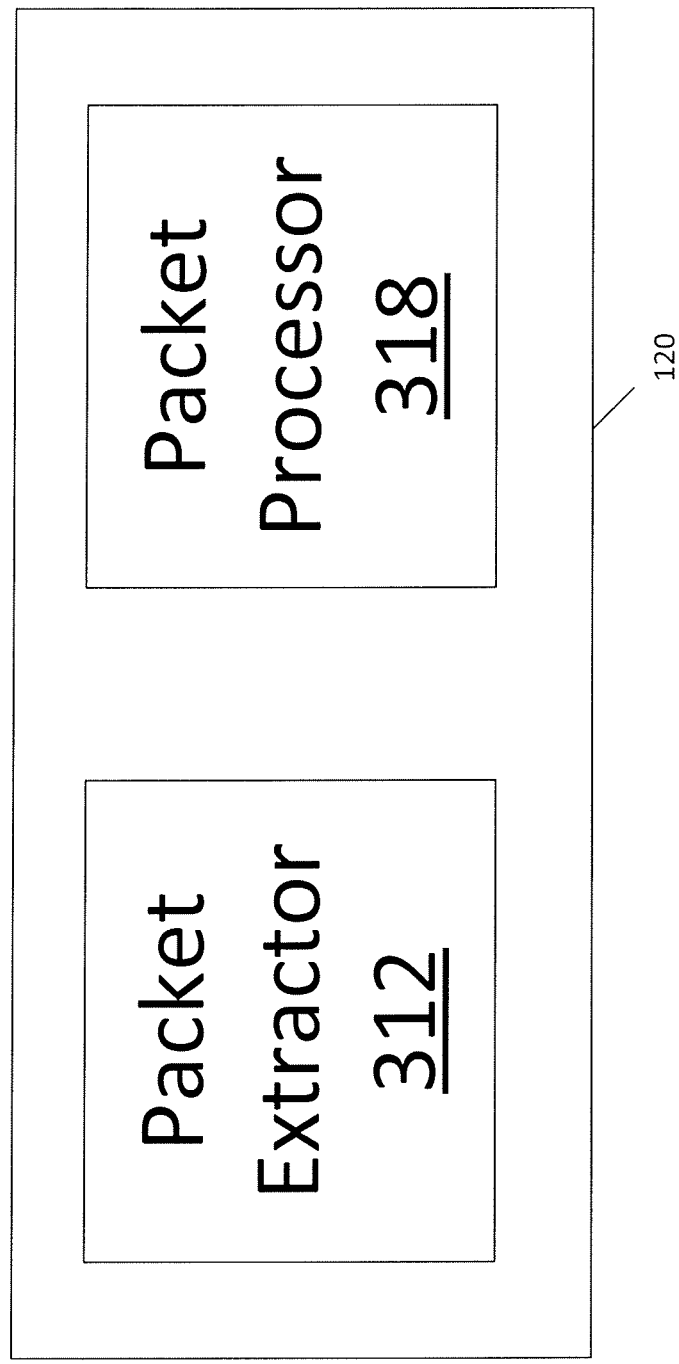
FIG. 3 is a block diagram of a packet analyzer for use within the networks of FIGS. 1A, 1B, and 1C in accordance with teachings described herein.

FIG. 3 is a block diagram illustrating components of an example of the packet analyzer 120. The illustrated packet analyzer 120 includes a packet extractor 312 and a packet processor 318. Packet analyzer 120 may include additional, fewer, or a different arrangement of components. Further, any one component of packet analyzer 120 may perform the functions described as being performed by one or more other components of packet analyzer 120.

Packet extractor 312 is configured to monitor packets on the network. The packet extractor may monitor/extract packets directly from a NPD 104 (see FIG. 1B) and/or from taps positioned on one or both sides of the NPD 104 (see FIG. 1C). The packet extractor may be a device such as a NetDetector available from Niksun Incorporated of Princeton, N.J.; Cisco IOS NetFlow running on a Cisco device available from Cisco Systems, Inc. of San Jose, Calif.; JUNOSe J-Flow running on a Juniper device available from Juniper Networks, Inc. of Sunnyvale, Calif.; or other device having the ability to capture packet information (continuous or sampling) for measuring the ratios of the different types of traffic on a network. Packet extractor 312 may be implemented using one or more of the computing modules described above with reference to FIG. 2.

Packet processor 318 is coupled to packet extractor 312 and is configured to analyze the packets extracted by packet extractor 312, e.g., to identify the beginning and/or end of a network attack such as a DoS or DDoS attack. Packet processor 318 may additionally be coupled to NPD 104 to set filters in NPD 104 to block malicious traffic and/or to remove filters after the malicious traffic has ceased. Packet processor 318 may be implemented using one or more of computing modules described above with reference to FIG. 2.

Packet processor 318 may be configured to develop a historic packet profile by examining the monitored packets received during some number of time periods preceding an instant time period. The duration of the individual time periods and the number of time periods is selected to obtain a representative sample of the packet traffic on the network. In an example, the duration of each time period is 10 minutes and the number of time periods used to develop the historic packet profile is 6 (i.e., one hour of time for 10 minute periods). Absent a DoS or DDoS attack, the proportions of the packet types for the network traffic packets during the time periods remain relatively stable. The time periods may be shorter or longer and more or fewer time periods may be employed to develop the historic packet profile. The packet processor 318 develops an instant packet profile by examining the monitored packets from the instant time period (e.g., the most recent 10 minutes) and comparing the instant packet profile (e.g., developed for the most recent 10 minutes) to the historic packet profile (e.g., developed for the one hour preceding the most recent 10 minutes) at the end of the instant time period. The packet processor 318 identifies a network attack based on the comparison of the instant packet profile to the historic packet profile, for example, upon recognizing a significant statistical change in the proportion of one packet type to one or more other packet types used to develop the packet profiles as described in further detail below. Packet processor 318 may additionally be configured to identify the end of a network attack as described below with reference to FIGS. 4 and 4B and perform other functionality in accordance with the teachings herein.

Packet extractor 312 may be configured to periodically send packet information to the packet processor 318, e.g., every ten minutes, which includes all packet information from the last time packet information was sent (or a representative sample of the packet information). The packet information may include the packet header of each packet or other information from which the packet type may be determined. A representative sample includes packet information from a subset of packets occurring within a time period (e.g., packet information for every $10^{th}$ packet captured or monitored). Alternatively, packet extractor 312 may store all packet information (or a representative sample of the packet information) and packet processor 318 may periodically poll packet extractor 312 to retrieve the stored packet information for a desired time period, e.g., the last ten minutes.

In an example, the packet processor 318 polls the packet extractor 312 during a time period, e.g., every 10 minutes, to collect packet information (such as number of packets for that prior time period window broken down by IP layer protocol). This collected information may be stored by the packet processor 318 in a database—with values of each packet type preserved for several prior time period windows, e.g., values from 6 consecutive prior time period windows, to develop a historic packet profile. When a new batch of packet information is collected, the packet processor 318 may determine an instant packet profile for the new data and statistically compare the instant packet profile for the new data against a historic packet profile (e.g., a packet profile developed from the values from the last 6 time periods) stored in the database. If the instant packet information lies outside a predetermined statistical threshold, e.g., 5 or more standard deviations away from the expected value, in comparison to an expected result based on the historic packet profile an exception would be raised—indicating the presence of malicious traffic. The packets could then be further examined to identify the source and/or destination of the malicious traffic. A standard deviation for the historic packet profile may be found by computing an average value for a particular packet type ratio (e.g., ratio of TCP packets to all packets) from the time period windows used to develop the historic packet profile; and, then, taking the square root of the average of the squared differences of the packet type ratios from their average value to determine the standard deviation. The standard deviation may then be multiplied by a number (e.g., 5 to obtain 5 standard deviations) to determine the statistical threshold for comparison with the packet type ratio of the instant packet profile. If the difference between the packet ratio of the instant packet profile and the average packet ratio of the historic packet profile is greater than the statistical threshold, the existent of a network attack is identified. For a normal distribution, nearly all values lie within 3 standard deviations (i.e., approximately 99.7%). In examples described herein, 5 standard deviations (5 sigma) are selected as a threshold, however, more or fewer standard deviations may be selected depending on how closely the network traffic mimics a normal distribution, the desire to eliminate false positives in identifying the existence of network attacks, etc.

Other layers of the network stack may be used to detect anomalous traffic flows in addition to or instead of packets in the IP layer. For example, the proportion of HTTP/HTTPS/other traffic within the TCP layer is usually fairly steady, and significant changes in a ratio of that traffic could indicate an issue. Using filters on the data being analyzed, it is possible to detect anomalies in situations related to specific applications.

Figure 4:
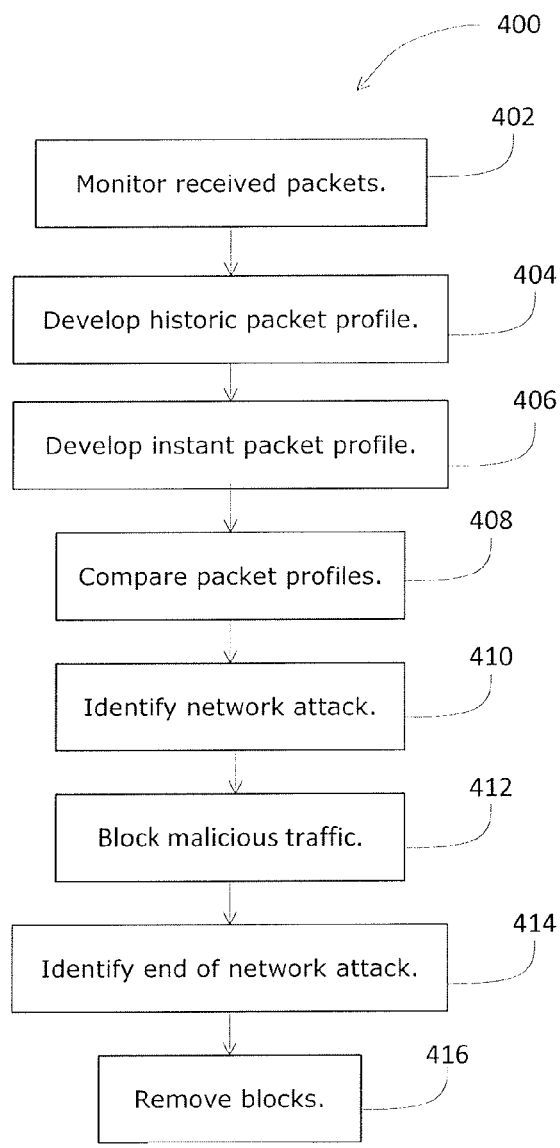
FIG. 4 is a flowchart of steps for identifying the start and the end of a network attack in accordance with teachings described herein.
Figure 4A:
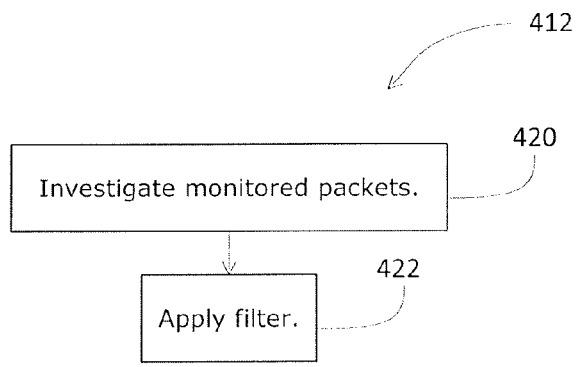
FIG. 4A is a flowchart of more detailed steps for performing the blocking of malicious traffic in the flow chart of FIG. 4 in accordance with teachings described herein.
Figure 4B:
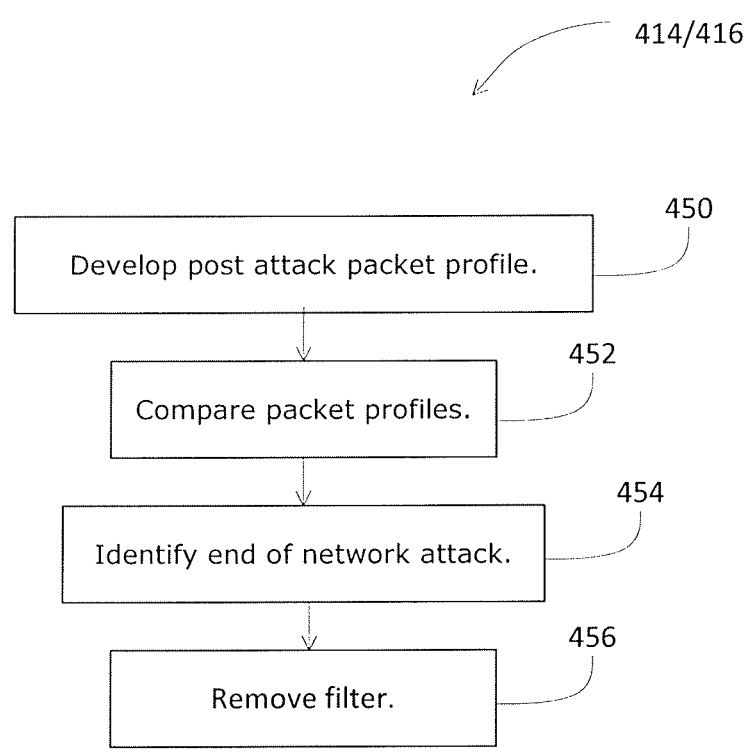
FIG. 4B is a flowchart of more detailed steps for performing the identifying the end of a network attack and removing traffic blocks in the flow chart of FIG. 4 in accordance with teachings described herein.

FIGS. 4, 4A, and 4B are flowcharts of steps for identifying the start and the end of network attacks. The steps of flowcharts depicted in FIGS. 4, 4A, and 4B may be performed by the packet analyzer 120 described above (see FIGS. 1B, 1C, and 2). Other devices may be used to implement one or more of the steps within the flowcharts.

FIG. 4 is a flowchart of a process 400 for identifying the start and the end of network attacks. When a network attack is identified, malicious traffic associated with the network attack may be blocked (e.g., by setting a filter in network protection device 104 and/or router 156). When the end of a network attack is identified, the blocks may be removed (e.g., by removing the filter in network protection device 104 and/or router 156). Packet analyzer 120 may execute process 400 while monitoring traffic flow through a network protection device 104.

At block 402, packets received for delivery to devices on a network are monitored. The packets may be received by network protection device 104 from outside the network 154 and/or from inside the network 152 for delivery to a device within the network, e.g., a services/mobiles network. Packet extractor 312 may monitor the received packets by extracting them from the network protection device 104 or by extracting them from network taps positioned on one or both sides of the network protection device 104. Packet extractor 312 may extract all of the packets received by network protection device 104 or may periodically sample packets received by network protection device 104 to obtain a representative sample. Packet extractor 312 may store the extracted packets in a database within a memory 260 (FIG. 2).

At block 404, a historic packet profile is developed. The historic packet profile may be developed by examining the monitored packets received during a plurality of time periods preceding a time period of interest (the "instant" time period). In one example, the time periods used for developing the historic packet profile may be time periods immediately preceding the instant time period. In other examples, the time periods used for developing the historic packet profile may be time periods preceding the instant time period that are likely to have similar characteristics, e.g., a similar time the preceding day or a similar time on the same day of a preceding week.

Packet analyzer 120 (e.g., packet processor 318) may develop the historic packet profile based on information received from packet extractor 312. The historic packet profile may include a ratio of number or rate of packets of at least one packet type (e.g., number or rate of TCP packets) to number/rate of packets of one or more other packet types (e.g., UDP packets, UDP/TCP packets, all packets, etc.) within the monitored network traffic for each of the plurality of time periods. Additionally, or alternatively, the historic packet profile may include a sample standard deviation representing the deviation of the packet ratio among the time periods making up the historic packet profile.

A time period may be 10 minutes, for example, and the historic packet profile may include six time periods. The instant time period is the time period of current interest, which may also be 10 minutes in duration. Thus, the historic packet profile in this example would include one hour, i.e., 60 minutes, preceding the instant time period.

At block 406, an instant packet profile is developed. The instant packet profile may be developed by examining the monitored packets received during a time period of interest (e.g., the current time period). Packet analyzer 120 (e.g., packet processor 318) may develop the current packet profile based on information received from packet extractor 312. The instant packet profile may include a ratio of at least one packet type (e.g., TCP packets) to one or more other packet types (e.g., UDP packets UDP/TCP packets, all packets, etc.) within the monitored network traffic for each of the plurality of time periods.

The instant time period is the time period of current interest, which may be the same duration as the individual time periods used to generate the historic packet profile, e.g., 10 minutes. Thus, the current packet profile in this example may include the 10 minutes following the 60 minute historic time period.

At block 408, the instant packet profile is compared to the historic packet profile to determine deviation. Packet analyzer 120 (e.g., packet processor 318) may compare the packet profiles to determine whether a deviation exceeding a predetermined statistical threshold deviation between the instant packet profile and historic packet profile is present. Packet processor 318, for example, may compare a packet ratio (e.g., numbers of TCP to UDP, TCP/UDP, or total packets) in the instant packet profile to an average of the packet ratios from the individual time periods in the historic packet profile to determine a difference. Packet processor 318 may additionally compare the determined difference to the sample standard deviation from block 404, to determine the extent of any deviation of the instant packet profile from the historic packet profile.

At block 410, the existence of a network attack is identified. The existence of a network attack is identified in response to determining that the deviation of the instant packet profile to the historic packet profile exceeds the predetermined statistical threshold deviation. Packet analyzer 120 (e.g., packet processor 318) may identify the existence of the network attack. A network attack may be identified when the instant packet profile is outside of a statistical threshold with respect to the historic packet profile (e.g., from a 91%-8% TCP-UDP mix to a 85%-14% TCP-UDP mix). The statistical threshold may be five standard deviations (i.e., 5 sigma). In this example, a network attack would be identified if the instant packet profile deviated from the historic packet profile by more than five standard deviations.

Upon the identification of a network attack at the site of a network protection device, for example, malicious traffic may be identified manually and/or automatically by packet processor 318. Operational staff may be notified to investigate the attack and take corrective action such as blocking the malicious traffic as described below with reference to block 412. In an example, an operator may examine the network traffic for the site in a time window (e.g., 30 to 60 minutes) associated with the attack, focusing on the anomalous packet type (e.g., if there is a relatively large increase in UDP traffic, the UDP packets are examined). The time window being analyzed may then be adjusted to detect the approximate start time of the incident (e.g., within a few minutes or less). Additionally, the IP addresses that are top sources and/or destinations for the anomalous packet type are examined.

Individual destination IP addresses typically each receive less than 0.5% of all the traffic going into a particular site at any one time, so if a destination IP address begins to receive 20% or more of all UDP traffic, for example, there is a high probability that that IP address is the target of the DoS attack. A filter may then be applied to analyze the traffic specifically for that destination IP address (and having the anomalous packet type) to profile the source addresses. If the operator determines that there has been a substantial increase in the number of packets directed to a particular destination address from one or more source addresses, the one or more source addresses may be identified as the source of the malicious traffic and all traffic from these source addresses may be blocked. In another example, packet processor 318 or another processing device may be configured to perform one or more of identifying the anomalous traffic type, searching the time window with a filter of the anomalous traffic type, identifying destination hosts that receive a relatively large percentage of that traffic (e.g., greater than 5%), identifying sources that have a relatively significant contribution to the destination host's traffic, and blocking source addresses corresponding to these addresses.

At block 412, malicious traffic associated with the network attack is blocked. Packet analyzer 120 may instruct network protection device 104 and/or router 156 to apply a filter that blocks traffic from, for example, one or more addresses corresponding to the malicious traffic.

In one example of use, steps 404 to 410 may be performed by a program running on the packet processor 318. The program may poll the packet extractor 312 every 10 minutes, for example, collecting counts of packets for a prior 10 minute window broken down by IP layer protocol. These counts/values may be stored in a database, with the previous 6 values of each type preserved. When a new batch of data is collected, it is statistically compared against the previous 6 values stored in the database and if the new data lies 5 or more standard deviations away from the expected value, an exception would be raised.

FIG. 4A depicts the blocking of malicious traffic 412 in additional detail. At block 420, monitored packets are investigated manually or automatically. Packet analyzer 120 (e.g., packet processor 318) may be used to investigate monitored packets by examining information such as the source address of packets that contributed to the discrepancy in the comparisons of the packet profiles.

At block 422, a filter is applied to block the malicious traffic. Packet processor 318 may instruct network protection device 104 and/or router 156 to apply a filter, e.g., at the direction of an operator or automatically. The filter may be configured within network protection device 104 and/or router 156 to block traffic associated with the source address of the malicious traffic and/or its destination.

Referring back to FIG. 4, at block 414, the end of a network attack is identified. Packet analyzer 120 (packet processor 318) may identify the end of the network attack. At block 416, the blocking of malicious traffic in accordance with block 412 is stopped. Packet processor 318 may cease to block traffic by instructing network protection device 104 to remove the filter applied at block 422.

FIG. 4B depicts steps for identifying the end of a network attack 414 and the removal of blocks 416 in additional detail. At block 450, a post attack packet profile is developed. The post attack packet profile may be developed by examining the monitored packets received during a time period of interest (e.g., periodically at time periods following the identification of an attack). Packet analyzer 120 may examine packets through a network tap on the services network side of the firewall (see FIG. 1C). This is because the firewall may start blocking the malicious traffic during an ongoing attack, thereby causing the packet deviation to decrease on the mobiles network side.

Packet analyzer 120 (e.g., packet processor 318) may develop the post attack packet profile as described above for the instant packet profile at block 406. The time period following the identification of the attack may be the same duration as the time periods used to generate the current and historic packet profiles, e.g., 10 minutes. Thus, the post attack packet profile in this example includes a 10 minute time period at some time after the identification of the attack. The packets may be continuously sampled in overlapping or non-overlapping time periods after the start of an attack to obtain data for use in identification of the end of an attack.

At block 452, the post attack packet profile is compared to the historic packet profile to determine deviation. Packet analyzer 120 (e.g., packet processor 318) may compare the packet profiles. Packet analyzer 120 may compare the packet profiles as described above at block 408 to determine whether a new deviation for the post attack packet profile as compared to the historic packet profile is below a second statistical predetermined threshold deviation.

At block 454, the end of the network attack is identified. Packet analyzer 120 may identify the end of a network attack. The end of a network attack may be identified in response to the post attack packet profile for one or more periods being below a predefined statistical threshold of the historic packet profile, e.g., within five standard deviations. In one example, the end of a network attack may be identified when at least two consecutive post attack packet profiles fall within the predefined statistical threshold. A first post attack packet profile falling with the predefined statistical threshold may provide an indication that the network attack is over and second and subsequent post attack packet profiles falling with the predefined statistical thresholds may guard against prematurely declaring an end to the network attack. Additionally, the statistical threshold for identifying the end of a network attack may be more stringent than for the identification of an attack, e.g., less than four standard deviations as opposed to five standard deviations for identifying an attack. In one example, the statistical threshold for identifying the end of a network attack is more stringent than for the identification of the start of a network attack in order to guard against both prematurely declaring the existence of a network attack and, once declared, prematurely declaring an end to the network attack.

At block 456, filters that were added after the identification of a network attack are removed now that the end of the network attack has been identified. Packet analyzer 120 (e.g., packet processor 318) may instruct network protection device 104 to remove a previously added filter that blocks traffic from for example one or more addresses associated with the malicious traffic.

Figure 5A:
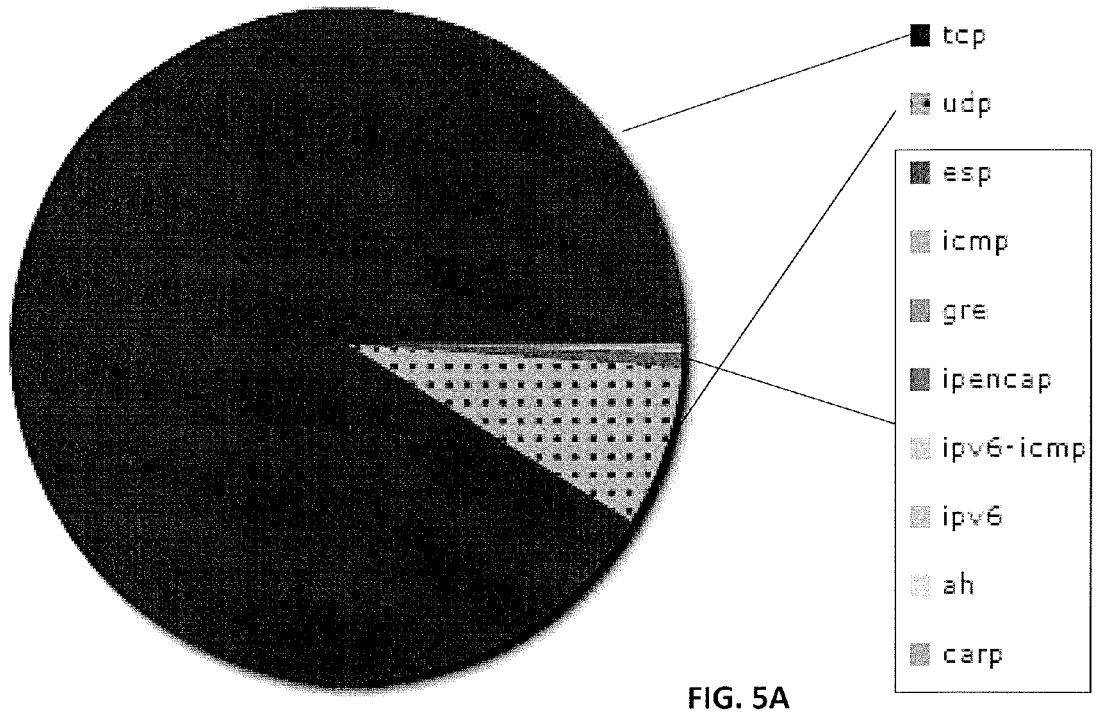
FIG. 5A is a pie chart of typical packet protocol distribution at the IP layer.

Under normal traffic flows, at the IP layer, the protocol distribution consists of mainly TCP traffic packets, with a small amount of UDP traffic packets and a trace of other protocols (e.g., esp, icmp, gre, ipencap, ipv6-icmp, ipv6, ah, and carp) as depicted in FIG. 5A.

Figure 5B:
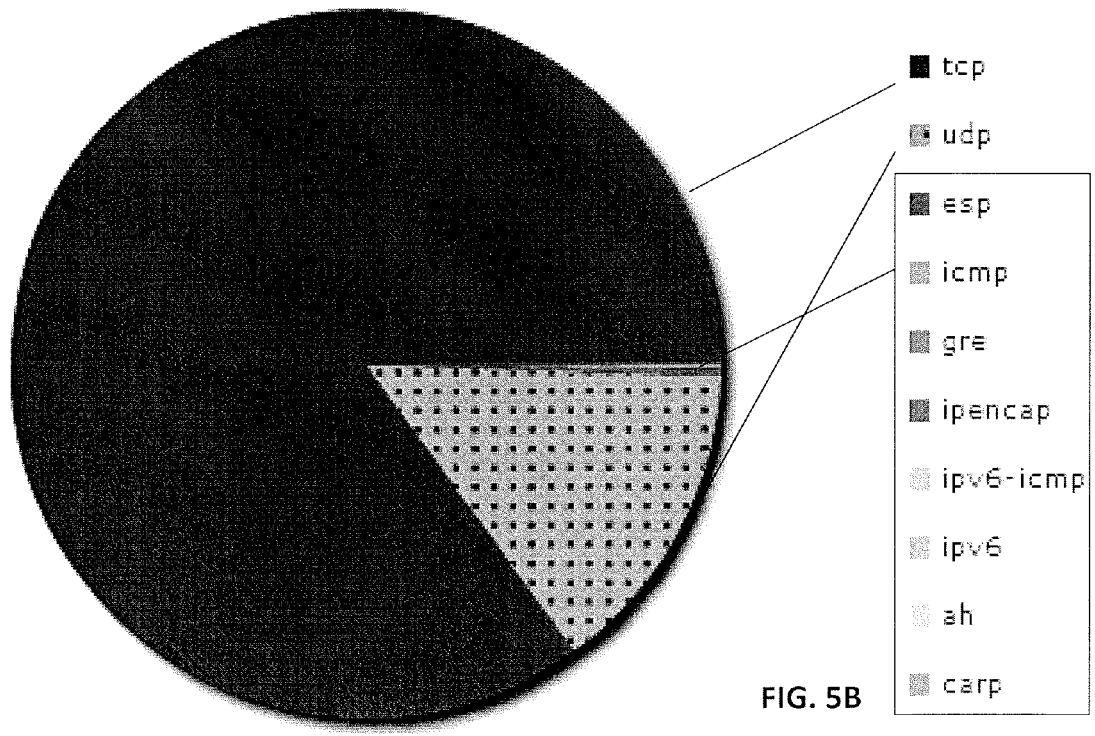
FIG. 5B is a pie chart of packet protocol distribution at the IP layer for a network under a denial of service attack.

When a particular IP address or addresses at the network protection device 104 are under attack, the IP profile changes significantly, as depicted in FIG. 5B, even with a minor event such as a UDP flood. The variance in the IP protocol ratios is so small under normal traffic flow, that this change (from a 91%-8% TCP-UDP mix (FIG. 5A) to a 85%-14% TCP-UDP mix (FIG. 5B)) is a statistically significant event and can be used to identify the flood without relying on a static threshold with regard to packet flow rate for overall traffic and/or for traffic of just one or more packet types.

Figure 6:
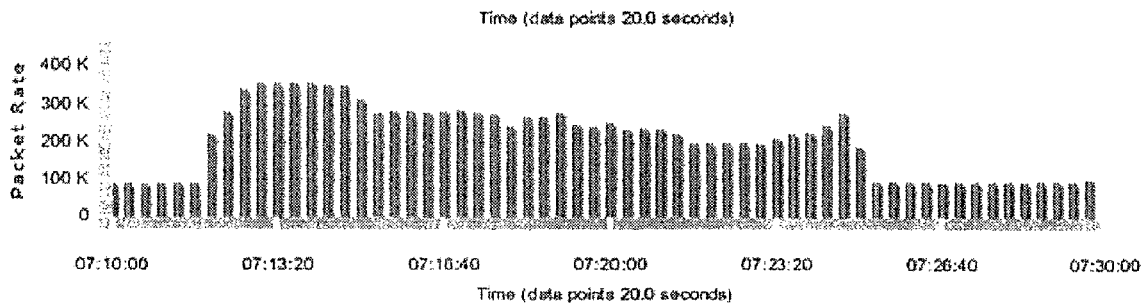
FIG. 6 is a bar chart of UDP packets over time in a network that experiences a network attack.

Thus, the use of protocol ratios provides a generic way of detecting network attacks over and above the use of raw packet count changes. Also, while humans are good at detecting elongated spikes in traffic such as depicted in FIG. 6, it can be difficult to do programmatically without generating false alarms.

Figure 7A:
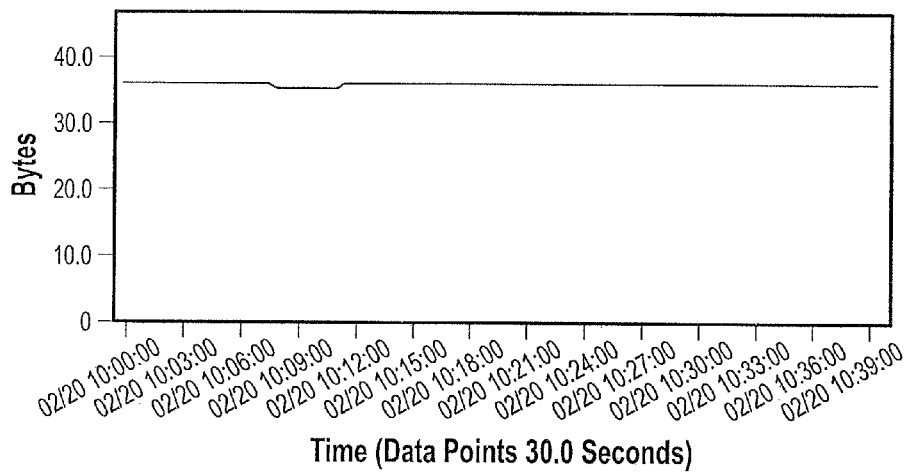
FIG. 7A is a graph of bandwidth in a network that experiences a network attack.
Figure 7B:
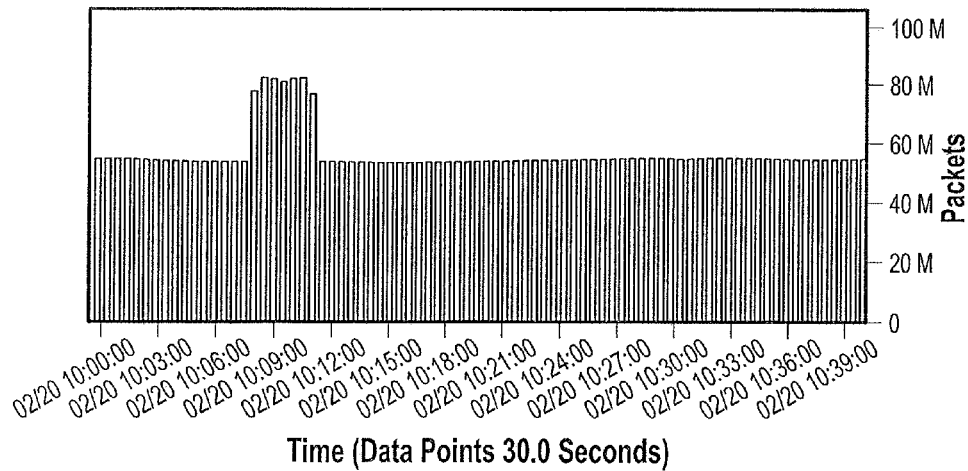
FIG. 7B is a bar chart of packets over time in a network that experiences a network attack in accordance with teachings described herein.

An example is now provided for a DoS attack starting at 19:10 EST Feb. 20, 2013 and ending at 19:30 EST Feb. 20, 2013 (times are provided in military format). An initial view of the utilized bandwidth graph depicted in FIG. 7A shows a dip rather than a spike around this time. Because a DoS attack involves bombarding a device and/or network with network traffic, an increase in network traffic would be expected during a DoS attack. Thus, contrary to what would be expected, the DoS attack coincided with a reduction in bandwidth. Hence, simply looking at the volume of traffic on the network would not have identified this DoS attack. The event, however, does shows up in other ways. Viewing the packet rate depicted in FIG. 7B does show a general uptick. The packet count went from 53.63M packets to 77.72M packets per window (each window is 30 seconds).

Figure 7C:
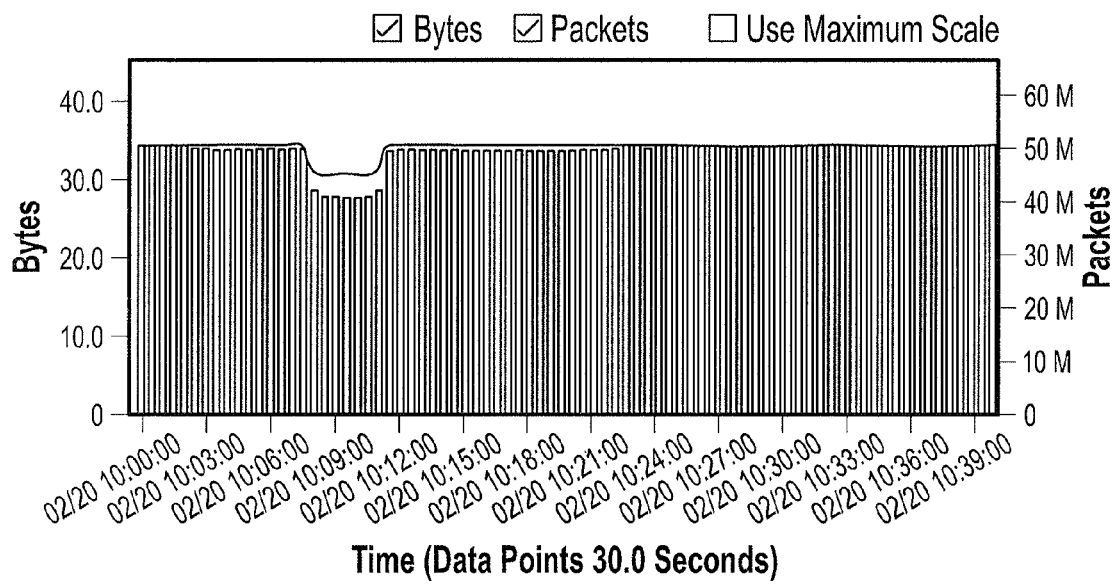
FIG. 7C is a bar chart of TCP packets over time in a network that experiences a network attack.
Figure 7D:
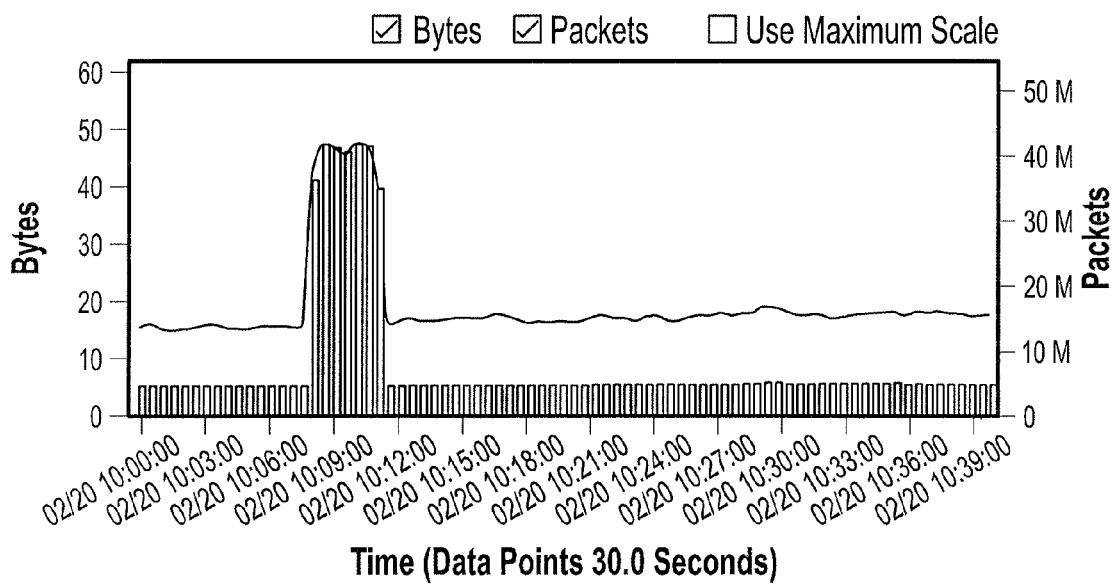
FIG. 7D is a bar chart of UDP packets over time in a network that experiences a network attack.

Looking at just the TCP traffic, depicted in FIG. 7C, a dip occurs in this traffic during the event and, thus, does not provide a direct indication of a DoS attack for which increased traffic would be expected. As discussed below, however, the UDP traffic increases during the event. In this example, the site traffic was monitored at a rate that was less than the rate of traffic through the site. Thus, the increase in UDP traffic resulted in a decrease in the TCP traffic due to the UDP traffic representing a larger portion of the monitored traffic. The UDP traffic graph, depicted in FIG. 7D makes things clearer. In the sample, the traffic goes from 3.95M packets in 30 seconds to 35.78M packets in the next 30 s window. Thus, both the amount of UDP traffic and proportion of UDP/TCP traffic through the firewall increases dramatically, much more so than the overall amount of traffic through the firewall. Thus, detection of one or both of these values permits more sensitive detection of an event such as a DoS attack as compared with the overall traffic.

In the example depicted in FIGS. 7A-7d, a historic packet profile may be developed that includes the ratio of UDP packets to total packets during a rolling 3 minute period preceding the attack along with a UDP packet average and a sample standard deviation of the UDP packets to total packets during 30 second windows within the rolling 3 minute period (Step 404 of FIG. 4). An instant packet profile may be developed that includes the ratio of UDP packets to total packets during the next 30 seconds (Step 406 of FIG. 4). The instant packet profile is then compared to the historic packet profile (Step 408 of FIG. 4) to identify a network attack (Step 410 of FIG. 4), e.g., by determining the standard deviation of the UDP packet ratio of the instant packet profile to the UDP packet ratio, average, and standard deviation of the historic packet profile. The order of magnitude increase is this example is relatively 'easy' to detect by magnitude alone, but not all such floods are as readily apparent. The method of analyzing packet ratios enables us to detect this, and more complex situations with a single approach.

Table 1 below includes packet volume data for packets extracted from the IP layer. The packet data represents traffic flowing through a node of a network. The first column represents time windows in consecutive ten minute increments. The second column represents the ratio of number of TCP packets to number of total packets during each respective ten minute period. The third column represents the total number of TCP packets in millions. The fourth column represents the ratio numbers of UDP packets to total packets during a respective ten minute period. The fifth column represents the total number of UDP packets in millions. The sixth column represents the average of the TCP packet ratio for the six time windows preceding the instant time period. The seventh column represents the sample standard deviation in the TCP packet ratio for the six time windows preceding the instant time period. The seventh column represents the standard deviation of the instant TCP packet ratio to the sample standard deviation.

When reviewing the protocol ratio data in Table 1, the onset of the event triggers a −63 sigma change in the ratio of TCP to total traffic in time window 1900-1910.

TABLE 1

| Time Window | TCP ratio | TCP packets (M) | UDP ratio | UDP packets (M) | TCP ratio (prior 6 windows) | TCP ratio (stdev) | TCP ratio sigma |
|---|---|---|---|---|---|---|---|
| 1750-1800 | 92.09 | 1270 | 7.58 | 104.67 | 92.29 | 0.11 | −1.79 |
| 1800-1810 | 92.28 | 951.73 | 7.41 | 76.48 | 92.24 | 0.13 | 0.29 |
| 1810-1820 | 92.07 | 938.96 | 7.64 | 77.9 | 92.26 | 0.12 | −1.56 |
| 1820-1830 | 92.13 | 1240 | 7.56 | 101.65 | 92.20 | 0.10 | −0.67 |
| 1830-1840 | 92.19 | 925.02 | 7.52 | 75.43 | 92.17 | 0.08 | 0.31 |
| 1840-1850 | 92.26 | 913.91 | 7.45 | 73.81 | 92.16 | 0.08 | 1.24 |
| 1850-1900 | 92.33 | 1210 | 7.39 | 97.12 | 92.17 | 0.09 | 1.82 |
| 1900-1910 | 85.94 | 879.74 | 13.8 | 141.26 | 92.21 | 0.10 | −63.86 |
| 1910-1920 | 76.81 | 846.28 | 22.94 | 252.79 | 91.15 | 2.56 | −5.61 |
| 1920-1930 | 91.85 | 1200 | 7.83 | 101.92 | 88.61 | 6.30 | 0.51 |

This kind of change in protocol ratios is highly unlikely to happen (even if a carrier had been around since the start of the Universe) due to the observed consistency of packet types in network traffic, so it is a reliable indicator of anomalous traffic.

Blocking a packet, request, or message includes dropping the packet, request, or message and/or not forwarding the packet, request, or message. Blocking a packet, request, or message may include storing the packet, request, or message for further analysis, for example. Accepting or allowing a packet, request, or message may include forwarding the packet, request, or message to its intended recipient or a proxy for the intended recipient.

Nothing that has been stated or illustrated is intended or should be interpreted to cause a dedication of any component, step, feature, object, benefit, advantage, or equivalent to the public, regardless of whether it is or is not recited in the claims.

Unless otherwise stated, all measurements, values, ratings, positions, magnitudes, sizes, and other specifications that are set forth in this specification, including in the claims that follow, are approximate, not exact. They are intended to have a reasonable range that is consistent with the functions to which they relate and with what is customary in the art to which they pertain.

While the foregoing has described what are considered to be the best mode and/or other examples, it is understood that various modifications may be made therein and that the subject matter disclosed herein may be implemented in various forms and examples, and that the teachings may be applied in numerous applications, only some of which have been described herein.

The scope of protection is limited solely by the claims that now follow. That scope is intended and should be interpreted to be as broad as is consistent with the ordinary meaning of the language that is used in the claims when interpreted in light of this specification and the prosecution history that follows and to encompass all structural and functional equivalents. Notwithstanding, none of the claims are intended to embrace subject matter that fails to satisfy the requirement of Sections 201, 102, or 211 of the Patent Act, nor should they be interpreted in such a way. Any unintended embracement of such subject matter is hereby disclaimed.

It will be understood that the terms and expressions used herein have the ordinary meaning as is accorded to such terms and expressions with respect to their corresponding respective areas of inquiry and study except where specific meanings have otherwise been set forth herein. Relational terms such as first and second and the like may be used solely to distinguish one entity or action from another without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "a" or "an" does not, without further constraints, preclude the existence of additional identical elements in the process, method, article, or apparatus that comprises the element.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

What is claimed:

1. A method comprising:
   monitoring packets received for delivery to devices on a network;
   developing a historic packet profile by examining the monitored packets received during a plurality of time periods preceding an instant time period, the historic packet profile including a historic ratio of number of packets of at least one packet protocol to number of packets of two or more different packet protocols for the plurality of time periods preceding the instant time period;
   developing an instant packet profile by examining the monitored packets during the instant time period, the instant packet profile including an instant ratio of number of packets of the at least one packet protocol to number of packets of the two or more different packet protocols for the monitored packets within the instant time period;
   comparing, by a processor, the instant ratio to the historic ratio to determine whether a deviation exceeding a predetermined statistical threshold deviation between the instant ratio and the historic ratio is present;
   identifying, by the processor, existence of a network attack in response to determining that the deviation exceeds the predetermined statistical threshold deviation;
   applying a filter at a network protection device to block malicious traffic of the identified network attack;
   developing a post attack packet profile by examining the monitored packets subsequent to identification of the network attack, the post attack packet profile including a post attack ratio of number of packets of the at least one packet protocol to number of packets of the two or more different packet protocols for the monitored packets within the monitored packets subsequent to identification of the network attack;
   comparing the post attack ratio to the historic ratio to determine whether a new deviation is below a second statistical predetermined threshold deviation that is smaller than the predetermined statistical threshold deviation; and
   identifying an end of the network attack in response to determining that the new deviation is less than the second statistical predetermined threshold deviation.

2. The method of claim 1, the method further comprising in response to identifying the existence of a network attack:
   investigating the monitored packets in the instant time period to identify malicious traffic in response to the identified network attack.

3. The method of claim 2, further comprising:
   removing the filter in response to the identified end of the identified network attack.

4. The method of claim 1, wherein the at least one packet protocol consists of Transmission Control Protocol (TCP) or User Datagram Protocol (UDP) and the one or more different packet protocols comprises TCP and UDP.

5. The method of claim 1, wherein the monitoring comprises:
   monitoring packets in at least one of the Internet Protocol (IP) layer or the Transmission Control Protocol (TCP) layer.

6. The method of claim 1, wherein the monitoring step comprises:
   monitoring packets received from outside the network to transport to a device inside the network.

7. The method of claim 6, wherein the monitoring step further comprises:
   monitoring packets received from within the network.

8. The method of claim 1, wherein the packets are messaging packets and the monitoring step comprises:
   monitoring the messaging packets passing from a services network to a mobiles network.

9. The method of claim 8, further comprising the steps of:
   applying another filter at a router positioned between the Internet and the services network to block the malicious traffic; and
   removing the filter at the network protection device and the another filter at the router in response to the identified end of the identified network attack.

10. A system comprising:
    a network protection hardware device;
    packet extractor logic configured to monitor packets received at the network protection hardware device for delivery to devices on a network;
    a packet processor coupled to the packet extractor logic, the packet processor configured to:
    develop a historic packet profile by examining the monitored packets received during a plurality of time periods preceding an instant time period, the historic packet profile including a historic ratio of number of packets of at least one packet protocol to number of packets of two or more different packet protocols for the plurality of time periods preceding the instant time period;
    develop an instant packet profile by examining the monitored packets during the instant time period, the instant packet profile including an instant ratio of number of packets of the at least one packet protocol to number of packets of the two or more different packet protocols for the monitored packets within the instant time period;

compare the instant ratio to the historic ratio to determine whether a deviation exceeding a predetermined statistical threshold deviation between the instant ratio and the historic ratio is present;

identify existence of a network attack in response to determining that the deviation exceeds the predetermined statistical threshold deviation;

instruct the network protection hardware device to apply a filter to block malicious traffic of the network attack;

develop a post attack packet profile by examining the monitored packets subsequent to identification of the network attack, the post attack packet profile including a post attack ratio of number of packets of the at least one packet protocol to number of packets of the two or more different packet protocols for the monitored packets within the monitored packets subsequent to identification of the network attack;

compare the post attack ratio to the historic ratio to determine whether a new deviation is below a second statistical predetermined threshold deviation that is smaller than the predetermined statistical threshold deviation; and identify an end of the network attack in response to determining that the new deviation is less than the second statistical predetermined threshold deviation.

11. The system of claim 10, wherein the packet processor is further configured to:
investigate the monitored packets in the instant time period to identify the malicious traffic.

12. The system of claim 11, wherein the packet processor is further configured to:
instruct the network protection hardware device to remove the filter in response to the identified end of the identified network attack.

13. The system of claim 10, wherein:
the historic packet profile further includes a sample standard deviation of the ratio of the number of packets of the at least one packet protocol to the number of packets of the two or more different packet protocols, for the plurality of time periods preceding the instant time period.

14. The method of claim 10, wherein the at least one packet protocol consists of Transmission Control Protocol (TCP) or User Datagram Protocol (UDP) and the two or more different packet protocols comprises TCP and UDP.

15. The system of claim 10, wherein the packets are messaging packets, the network protection hardware device is positioned between a services network side and a mobiles network side, and the packet extractor logic includes a services tap on the services network side and a mobiles tap on the mobiles network side to extract messaging packets following between the services network and the mobiles network.

16. The system of claim 15, further comprising:
a router positioned between the Internet and the services network;
wherein the packet processor is further configured to instruct the router to apply another filer to block malicious traffic of the network attack, instruct the network protection hardware device to remove the filter in response to the identified end of the identified network attack, and instruct the router to remove the other filter in response to the identified end of the identified network attack.

17. A non-transient computer readable medium including instructions for execution by a computer, the instructions including:

monitoring packets received for delivery to devices on a network;

developing a historic packet profile by examining the monitored packets received during a plurality of time periods preceding an instant time period, the historic packet profile including a historic ratio of number of packets of at least one packet protocol to number of packets of two or more different packet protocols for the plurality of time periods preceding the instant time period;

developing an instant packet profile by examining the monitored packets during the instant time period, the instant packet profile including an instant ratio of number of packets of the at least one packet protocol to number of packets of the two or more different packet protocols for the monitored packets within the instant time period;

comparing the instant ratio to the historic ratio to determine whether a deviation exceeding a predetermined statistical threshold deviation between the instant ratio and the historic ratio is present;

identifying the existence of a network attack in response to determining that the deviation exceeds the predetermined statistical threshold deviation;

applying a filter at a network protection device to block malicious traffic of the network attack;

developing a post attack packet profile by examining the monitored packets subsequent to identification of the network attack, the post attack packet profile including a post attack ratio of number of packets of the at least one packet protocol to number of packets of the two or more different packet protocols for the monitored packets within the monitored packets subsequent to identification of the network attack;

comparing the post attack ratio to the historic ratio to determine whether a new deviation is below a second statistical predetermined threshold deviation that is smaller than the predetermined statistical threshold deviation; and identifying an end of the network attack in response to determining that the new deviation is less than the second statistical predetermined threshold deviation.

18. The non-transient computer readable medium of claim 17, wherein:
the historic packet profile further includes a sample standard deviation of the ratio of the number of packets of the at least one packet protocol to the number of packets of the two or more different packet protocols, for the plurality of time periods preceding the instant time period.

19. The non-transient computer readable medium of claim 17, wherein the packets are messaging packets and the monitoring step comprises:
monitoring the messaging packets passing from a services network to a mobiles network.

20. The non-transient computer readable medium of claim 19, wherein the method further comprises the steps of:
applying another filter at a router positioned between the Internet and the services network to block the malicious traffic; and
removing the filter at the network protection device and the another filter at the router in response to the identified end of the identified network attack.

* * * * *